United States Patent
Hasselbach et al.

[15] 3,691,441
[45] Sept. 12, 1972

[54] POWER CONNECTION SELECTION APPARATUS

[72] Inventors: Werner Hasselbach, Ann Arbor, Mich.; Peter L. Pompili, Toledo, Ohio

[73] Assignees: Sel-Con, Inc., Ann Arbor, Mich.; Verti-Case, Inc., Toledo, Ohio; part interest to each

[22] Filed: Feb. 19, 1971

[21] Appl. No.: 116,934

[52] U.S. Cl. ................................................. 318/441
[51] Int. Cl. ........................................... H02k 23/64
[58] Field of Search ....318/245, 441; 307/26, 72, 73, 307/128

[56] References Cited

UNITED STATES PATENTS

| 2,681,429 | 6/1964 | Long | 307/73 |
| 3,512,070 | 5/1970 | Futterer et al. | 318/441 X |
| 1,103,693 | 7/1914 | Shedd | 307/128 X |
| 2,079,092 | 5/1937 | Waters | 318/245 |

Primary Examiner—Bernard A. Gilheany
Assistant Examiner—W. E. Duncanson, Jr.
Attorney—Myron E. Click

[57] ABSTRACT

In a preferred embodiment the invention is illustrated in apparatus for improving the power factor and efficiency of a universal motor when the motor is to be used with either an alternating or direct current power source. The universal motor disclosed has a series winding, a compensating winding and an armature. The series winding and the compensating winding are connected in series with the armature. A first circuit includes a transformer having a primary winding and having the compensating winding of the motor as a secondary winding. A second circuit has the series winding and the armature connected in series. The output of a power source is sensed and connects the first circuit to the power source when alternating current is supplied, and connects the second circuit to the power source when direct current is supplied.

12 Claims, 3 Drawing Figures

PATENTED SEP 12 1972 3,691,441

INVENTOR
WERNER HASSELBACH
PETER L. POMPILI
BY
Myron E. Wick
ATTORNEY

POWER CONNECTION SELECTION APPARATUS

BACKGROUND OF THE INVENTION

Although a preferred embodiment of the invention will be described with respect to its application and use in small appliances, specifically in an electric can opener, it is to be noted that the inventive principle and structures disclosed herein are not to be confined to the specific use illustrated.

Small series motors are commonly designed to operate on either direct current or alternating current and so are called "universal motors." Universal motors may either be compensated or uncompensated, the latter type normally being used for the higher speeds and the smaller ratings only. Because of the reactance voltage drop, which is present in alternating currents but absent on direct current, the motor speed is somewhat lower for the same load alternating current operation, especially at high loads. On alternating current, however, the increased saturation of the field magnetic circuit at the crest of the sine wave of current may materially reduce the flux below the direct current value, and this tends to raise the alternating current speed. It is possible, therefore, to design small universal motors to approach the same speed-torque performance over the operating range, for all frequencies from zero to 60 cycles. Thus, previous compensated-type motors have been designed which, for example, are rated at 3,400 revolutions per minute and in which the 60 cycle speed may be within 2 percent of the direct current speed at full load torque, but fifteen percent or more lower at twice normal torque. On an uncompensated motor the speed drop will be materially greater. It is desirable though to have almost identical speed-torque performance from different power supplies for some applications.

Accordingly, it is an object of this invention to provide apparatus for improving the power factor and efficiency of the universal motor when the motor is to be used with either an alternating or a direct current power source.

It is a further object of this invention to provide apparatus for improving the operation of a universal motor by providing separate motor energizing circuits which are selected automatically in response to the connection of the motor to a power source.

It is a still further object of this invention to provide improved apparatus for automatically selecting proper power connections for a load when the load is to be driven by a plurality of different types of power sources.

SUMMARY OF THE INVENTION

The above objects of the invention are carried out by apparatus which features means for automatically selecting proper power connections for a load which includes a plurality of load energizing circuits, means for connecting the plurality of load energizing circuits to a power source, and switching means for connecting each of the plurality of load energizing circuits to a load. Means are utilized to sense one of a plurality of characteristics which a power source may have, after the power source has been connected to the plurality of load energizing circuits. Means responsive to the sensing means selects one of the plurality of switching means to connect a predetermined one of a plurality of load energizing circuits to the load in response to the sensing of a predetermined characteristic out of the plurality of possible characteristics of the power source.

The apparatus further advantageously features additional switching means interposed between the load and the plurality of first-mentioned switching means to permit energization and deenergization of a load when one of the plurality of first-mentioned switching means has connected a power source to a selected load energizing circuit. The additional switching means is advantageously biased normally open to prevent application of power to a load during operation of the sensing and selecting means.

The apparatus may further advantageously include selecting means designed to open the remainder of the plurality of switching means to disable the remainder of the plurality of load energizing circuits, when the one of the plurality of switching means is selected and connects the predetermined one load energizing circuit to a load.

Characteristics of the power source which may be sensed to cause selection of a predetermined load energizing circuit include whether the power source is supplying alternating current or direct current, different magnitudes of voltage and current of different power sources, different frequencies of the power supplied by different power sources, and the like.

The apparatus may further advantageously include means for rectifying an alternating current, when the load is to be driven by either alternating current or direct current, to enable application of direct current to a load whether a direct current or an alternating current power source is selected. The rectifying means may be connected between the plurality of load energizing circuits and the load to insure the application of the same polarity of current to the load without regard to the polarity connections of a direct current power source to the load energizing circuits.

Other objects, advantages, and features of this invention will become apparent when the following description is taken in conjunction with the accompanying drawings, in which.

DESCRIPTION OF THE PREFERRED EMBODIMENTS

Figure 1:
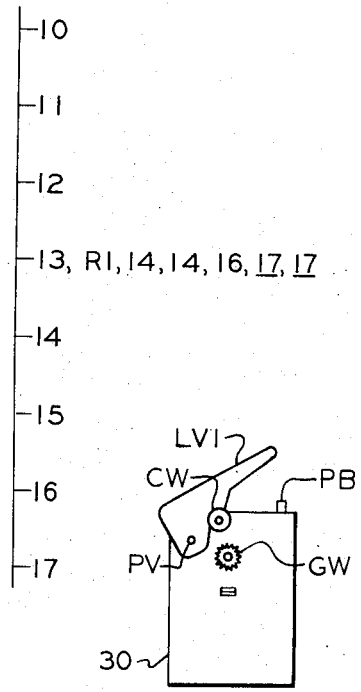
FIG. 1 is a front elevational view of an electrical appliance to which the teachings of this invention may be applied.

Referring to FIG. 1 there is illustrated an electrical appliance to which the teachings of this invention may be applied. An electrical can-opener indicated at 30 may particularly utilize the principles set forth herein since a can-opener is a portable appliance which is useful not only in the home but on boats, in trailers and in other situations where the standard 110 volt alternating current power supply might not be available, but where a different type of power supply is available. However, it is very desirable to maintain the speed-torque performance of the can-opener at substantially the same level whether the appliance is connected to 110 volts alternating current or, for example, 12 volts direct current, particularly since the load torque in opening various size cans may vary substantially. It is also desirable to effect the greatest efficiency possible whether the can-opener is connected to an alternating current or a direct current source so that the power drain on the direct current source will not be excessive.

The can-opener 30 includes a gear wheel noted at GW which is to be driven by the motor of this invention. A lever arm LV1 is pivoted on the can-opener 30 so that a cutting disc or wheel CW may be pivoted into and out of cutting engagement with a can rim and top which is being rotated by the gear wheel GW. A pushbutton PB is provided on the can-opener 30 and is biased in a normally open contact position so that the can-opener 30 is energized only when the lever LV1 is pivoted to engage the cutting wheel CW with the can.

Figure 2:
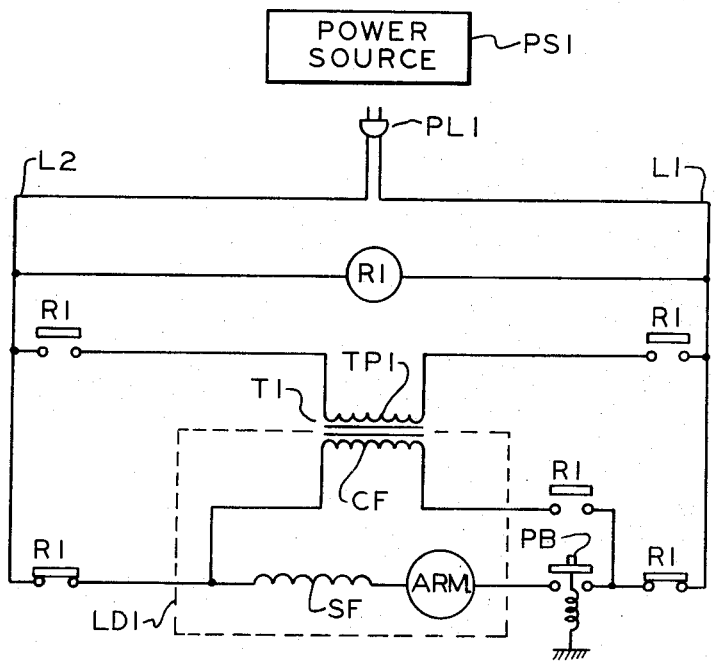
FIG. 2 is a schematic electrical circuit embodying the teachings of this invention and which may be utilized in the apparatus illustrated in FIG. 1.

Referring to FIG. 2 there is illustrated a schematic circuit diagram which may be utilized with the can-opener 30 in FIG. 1 to carry out the teachings of this invention.

Figure 3:
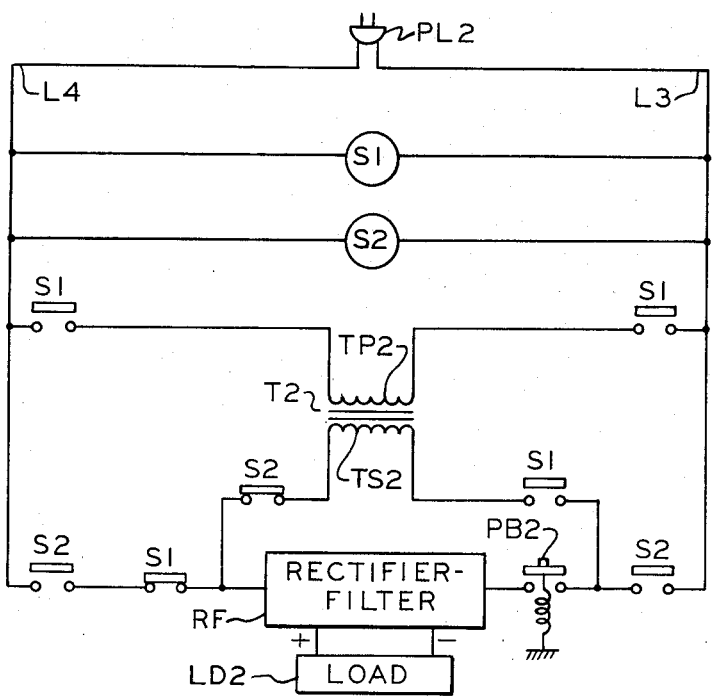
FIG. 3 is a schematic of an electrical circuit which illustrates alternative embodiments of the teachings of this invention.

It will be noted in the circuit diagrams of FIGS. 2 and 3 that numbered line diagrams have been utilized. The components can be readily located by reference to the line number where the component is positioned. Further, contact switching operations may be noted without designating a mechanical tie between the contacts and the actuating means. The contacts may be located at any convenient position even though quite remote from their actuating means. Cross reference between the actuating means and its associated contacts is easily accomplished by noting in the right-hand margin of the drawing the reference character of the actuating means, for example, R1 a relay in FIG. 1 adjacent to line 13, the line in which the relay coil R1 appears. Following the reference character R1 adjacent line 13, there are noted the line numbers in which R1 contacts close and open when caused to do so by their actuating coil, i.e., line numbers 14, 14 (since two R1 contacts appear in this line), 16, 17, 17. A contact line number notation that is not underlined indicates that those contacts are normally open as in lines 14 and 16. A contact line number notation that is underlined indicates that those contacts are normally closed, i.e. as in line 17.

In FIG 2 a power source PS1 is shown in line 10, which may supply either alternating current or direct current. A plug PL1 in line 11 is a means for connecting the circuit of FIG. 2 to the power source PS1 and supply power to the circuit via leads L1 and L2. A relay coil R1 in line 13 senses whether the power source is supplying alternating current or direct current power. In the embodiment illustrated in FIG. 1 the relay R1 is a relay which is responsive to 110 volts alternating current. That is, if the power source PS1 is supplying 110 volts alternating current the relay coil R1 is energized and closes R1 contacts in line 14 and 16 while opening the contacts R1 in line 17.

The closure of contacts R1 in line 14 connects an alternating current supply to a primary winding TP1 of a transformer T1 in line 15. A secondary winding CF of transformer T1, which is also the compensating field for the universal motor generally indicated at LD1, is connected in series with a series field SF, the armature, pushbutton contact switch PB, and contacts R1 in line 16. Since the R1 contacts in line 16 have been closed by the energization of relay coil R1 in line 13 the motor circuit is enabled for operation. Thus the movement of the lever LV1 of the can-opener 30 to depress the pushbutton PB1 completes the motor energization circuit and causes the motor LD1 to drive gear wheel GW to cooperate with the cutting wheel CW to open a can.

It will be noted that in a circuit of this type the switching means PB connected between the armature and the field circuits is advantageously normally biased open to prevent application of any power to the motor until the sensing and selection operations are completed.

If the power source is, for example 12 volts D.C. the relay R1 is not energized and 12 volts D.C. is connected through the normally closed back contacts R1 in line 17. Again, upon depression of the pushbutton PB, the motor LD1 is energized for operation through the series field SF and the armature. Since the contact R1 in line 16 is not closed during direct current energization of the motor LD1, the compensating field CF is not included in the energization circuit of the motor LD1. Therefore the series fields SF and the compensating field CF can be designed to insure that the universal motor LD1 provides substantially the same speed-torque output with varying loads whether being energized by alternating current or direct current. To this end it should be noted that it may be desirable to supply a higher voltage to the compensating field for alternating current operation than is supplied to the series field for direct current operation. For example if the power source is supplying 12 volts direct current, then the transformer T1 may be designed so that 23 volts alternating current is developed across the compensating field CF.

There is thus disclosed in FIG. 2 an inexpensive, highly efficient circuit which improves the performance of a universal motor which is to be utilized with two different types of power source. It is to be noted that although the relay R1 has been made responsive only to alternating current, that it would be quite simple to substitute a relay which is responsive to only direct current. If this substitution were made the closure relationship of the R1 contacts would be reversed. That is, R1 contacts in lines 14 and 16 would be normally closed and the R1 contacts in line 17 would be normally open.

A more universal circuit is illustrated in FIG. 3. A plug PL2 is provided for connecting a plurality of load energizing circuits to a load LD2 via leads L3 and L4. A plurality of sensing units, S1 in line 21 and S2 in line 22, are provided for sensing two different characteristics of power supplies to which the plug PL2 may be connected. The sensing units S1 and S2 are thus representative of sensing units which may sense and distinguish between a number of different characteristics of different types of power supplies. As noted hereinbefore the sensing units may sense characteristics of power supplies which may include alternating current, direct current, different magnitudes of voltage and current, different frequencies, and the like.

For example the sensing units S1 and S2 may be utilized to sense the difference between a 60 cycle supply frequency and a 25 supply cycle frequency. In response to the sensing of one of the two different frequencies by units S1, the S1 contacts close in lines 23 and 25 to supply energization to a load LD2 via transformer T2 through the primary TP2 and the secondary TS2. A back contact S1 in line 26 may be utilized which opens to disable the alternate or remaining load energizing circuit for the load LD2.

If the other of the two frequencies is sensed by the sensing unit S2 the load may be designed so that that frequency may operate the load directively, thus not requiring a transformer or other translating device to be inserted therebetween. However, it may be desirable to be able to operate the load from three different power supplies, so a second sensing unit S2 is shown which may be used in addition to a direct connection for load energization. If the sensing unit S2 is operated then a back contact S2 opens in line 25 to disable the first load energizing circuit while S2 front contacts close in line 26 to enable a second load energizing circuit.

It may be desirable to design the load LD2 so that it is driven by direct current whether the plug PL2 is connected to an alternating current source or a direct current source. Thus, a rectifier unit RF, which may include a filter, is connected between the two load energizing circuits and the load LD2. Thus the rectifier unit RF rectifies alternating current supplied via transformer T2 when the first load energizing circuit is selected. The rectifier RF as connected also insures that direct current supplied via the second load energizing circuit, when selected, will always be presented to the load LD2 with the same polarity, without regard to the polarity of the connection of plug PL2 to a direct current supply source.

By removing the transformer T2 from the circuit of FIG. 3, the circuit may be utilized to insure that the load LD2 is properly connected to the proper one of two different magnitudes of direct current power supplies. As shown, the sensing units S1 and S2 may sense and distinguish between 110 and 220 volts alternating current. In this latter instance the rectifier unit could be removed to permit load operation on alternating current.

Other modifications of the automatic power connection selection circuit of FIG. 3 will be obvious to those skilled in the art to sense the different characteristics of different types of power supplies and automatically connect the power supply to the correct load energizing circuit to enable most efficient operation of the load.

In conclusion, it is pointed out that while the illustrated examples constitute practical embodiments of our invention, we do not limit ourselves to the exact details shown since modifications of these details may be made without departing from the spirit and scope of this invention.

We claim:

1. Apparatus for improving the power factor and efficiency of a universal motor when the motor is being used with either an alternating current or a direct current power source comprising,
   a. a universal motor having a series winding and a compensating winding,
   b. first circuit means for supplying an alternating current to both said compensating winding and said series winding,
   c. second circuit means for supplying direct current to said series winding alone,
   d. means for sensing the output of a power source to indicate the kind of current being supplied by the source,
   e. means responsive to said sensing means for enabling said first circuit means when an alternating current is being supplied by a power source and for enabling said second circuit means when alternating current is being supplied by a power source.

2. Apparatus as defined in claim 1 in which
   a. said sensing means comprises relay coil means responsive only to alternating current, and in which
   b. said enabling means comprises normally open contact means responsive to said relay coil and connected in said first circuit, and normally closed contact means responsive to said relay coil and connected in said second circuit.

3. Apparatus as defined in claim 2 in which said first circuit includes transformer means having a primary winding for connection to said power source and in which said compensating winding of said universal motor acts as a secondary winding of said transformer means.

4. Apparatus as defined in claim 2 in which said enabling means is operative to disable the one of said first and second circuits not selected by said sensing means.

5. Apparatus for improving the power factor and efficiency of a universal motor when the motor is to be used with either an alternating or direct current power source comprising,
   a. a universal motor having a series winding, a compensating winding and an armature,
   b. said series winding and said compensating winding being connected in series with said armature,
   c. a first circuit including a transformer having a primary winding and having said compensating winding of said universal motor as a secondary winding,
   d. a second circuit having said series winding and said armature connected in series,
   e. relay means for sensing an alternating current or a direct current output from a power source and for connecting said first circuit to said power source when said power source is supplying alternating current, and for connecting said second circuit to said power source when said power source is supplying direct current.

6. Apparatus as defined in claim 5 in which
   a. said universal motor is driving a can-opener including a lever operated mechanism, and which further includes
   b. switching means between said first and second circuits and said armature, said switching means being biased normally open and is actuatable closed in response to said operation of said lever operated mechanism.

7. Apparatus for automatically selecting proper power connections for a load comprising,
   a. a plurality of load energizing circuits, b. means for connecting said plurality of load energizing circuits to a power source,
c. first switching means for connecting each of said plurality of load energizing circuits to a load,
d. means for sensing a plurality of characteristics of a power source after the power source has been connected to said plurality of load energizing circuits,
e. means for selecting one of said plurality of switching means to connect a predetermined one of said plurality of load energizing circuits to a load in response to the sensing by said sensing means of a first predetermined characteristic of said plurality of characteristics, and
f. second switching means interposed between a load and said plurality of first-mentioned switching means to permit energization and deenergization of a load when one of said plurality of first-mentioned switching means has connected a power source to a selected load energizing circuit.

8. Apparatus as defined in claim 7 in which said additional switching means is biased normally open to prevent application of power to a load during operation of said sensing and selecting means.

9. Apparatus for automatically selecting proper power connections for a load comprising,
a. a plurality of load energizing circuits,
b. means for connecting said plurality of load energizing circuits to a power source,
c. switching means for connecting each of said plurality of load energizing circuits to a load,
d. means for sensing a plurality of characteristics of a power source after the power source has been connected to said plurality of load energizing circuits, and
e. means for selecting one of said plurality of switching means to connect a predetermined one of said plurality of load energizing circuits to a load in response to the sensing by said sensing means of a first predetermined characteristic of said plurality of characteristics,
f. said selecting means opening the remainder of said plurality of switching means to disable the remainder of said plurality of load energizing circuits when said one of said plurality of switching means connects said predetermined one load energizing circuit to a load.

10. Apparatus for automatically selecting proper power connections for a load comprising,
a. a plurality of load energizing circuits,
b. means for connecting said plurality of load energizing circuits to a power source,
c. switching means for connecting each of said plurality of load energizing circuits to a load,
d. means for sensing a plurality of characteristics of a power source after the power source has been connected to said plurality of load energizing circuits,
e. means for selecting one of said plurality of switching means to connect a predetermined one of said plurality of load energizing circuits to a load in response to the sensing by said sensing means of a first predetermined characteristic of said plurality of characteristics,
f. said sensing means sensing the characteristics of alternating current and direct current and distinguishing therebetween to select one of a first and a second load energizing circuits, respectively, and
g. means for rectifying an alternating current to enable application of direct current to a load whichever of said first and second load energizing circuits are selected,
h. said rectifying means being connected between said first and second load energizing circuits and a load to insure the application of the same polarity of current to said load without regard to the polarity connections of a direct current power source to said load energizing circuits.

11. Apparatus for improving the power factor and efficiency of a universal motor when the motor is being used with either an alternating current or a direct current power source comprising,
a. a universal motor having a series winding and a compensating winding,
b. first circuit means for supplying an alternating current to both said compensating winding and said series winding,
c. second circuit means for supplying direct current to said series winding alone,
d. means for sensing the output of a power source to indicate the kind of current being supplied by the source,
e. means responsive to said sensing means for enabling said first circuit means when an alternating current is being supplied by a power source and for enabling said second circuit means when alternating current is being supplied by a power source, and
f. switching means connected between said first and said second circuit means and said windings to permit selective energization of said motor after said enabling means has selected one of said first and second circuits.

12. Apparatus for improving the power factor and efficiency of a universal motor when the motor is being used with either an alternating current or a direct current power source comprising,
a. a universal motor having a series winding and a compensating winding,
b. first circuit means for supplying an alternating current to both said compensating winding and said series winding,
c. second circuit means for supplying direct current to said series winding alone,
d. means for sensing the output of a power source to indicate the kind of current being supplied by the source,
e. means responsive to said sensing means for enabling said first circuit means when an alternating current is being supplied by a power source and for enabling said second circuit means when alternating current is being supplied by a power source,
f. said sensing means comprising relay coil means responsive only to alternating current,
g. said enabling means comprising normally open contact means responsive to said relay coil and connected in said first circuit, and normally closed contact means responsive to said relay coil and connected in said second circuit, and
h. switching means connected between said first and second circuit means and said windings, said switching means being biased in a normally open position to prevent application of current to said windings when said first and second circuits are initially connected to a power source and before selection of one of said first and second circuits by said enabling means.

* * * * *